(12) United States Patent
Kakui (10) Patent No.: US 8,009,708 B2
(45) Date of Patent: Aug. 30, 2011

(54) OPTICAL AMPLIFICATION MODULE AND LASER LIGHT SOURCE APPARATUS

(75) Inventor: Motoki Kakui, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 34 days.

(21) Appl. No.: 12/432,988

(22) Filed: Apr. 30, 2009

(65) Prior Publication Data

US 2009/0274183 A1    Nov. 5, 2009

(30) Foreign Application Priority Data

Apr. 30, 2008  (JP) ................... 2008-118790

(51) Int. Cl.
*H01S 3/13* (2006.01)
(52) U.S. Cl. ...................................... 372/31
(58) Field of Classification Search ... 372/6; 359/337.2, 359/341.5; 356/28
See application file for complete search history.

(56) References Cited

U.S. PATENT DOCUMENTS

| | | | |
|---|---|---|---|
| 5,731,892 A * | 3/1998 | DiGiovanni et al. | 359/337.4 |
| 6,483,973 B1 * | 11/2002 | Mazzarese et al. | 385/123 |
| 6,636,347 B1 * | 10/2003 | Wang et al. | 359/341.5 |
| 6,922,503 B2 * | 7/2005 | Hasegawa | 385/28 |
| 2007/0053400 A1 * | 3/2007 | Sinha et al. | 372/64 |
| 2010/0215067 A1 * | 8/2010 | Ripin et al. | 372/29.02 |

FOREIGN PATENT DOCUMENTS

JP  2007-194501  8/2007

* cited by examiner

*Primary Examiner* — Jessica Stultz
*Assistant Examiner* — Tuan Nguyen
(74) *Attorney, Agent, or Firm* — Venable LLP; Michael A. Sartori; Kyle D. Petaja

(57) ABSTRACT

The present invention relates to an optical amplifier module, or the like, having a structure for enabling effective suppression of photodarkening and efficient optical amplification. The optical amplifier module comprises a first optical amplification waveguide which is comprised of a phosphate glass as a main component and includes a ytterbium-doped first optical waveguide region, a second optical amplification waveguide which is optically coupled to the first optical amplification waveguide and includes a ytterbium-doped second optical waveguide region which is co-doped with aluminum, and pumping light source units which supply pumping light respectively to the first optical amplification waveguide and the second optical amplification waveguide. The light to be amplified, having inputted to the first optical amplification waveguide, is amplified only once by means of the pumping light, in each of the first optical amplification waveguide and the second optical amplification waveguide.

12 Claims, 10 Drawing Sheets

OPTICAL AMPLIFICATION MODULE AND LASER LIGHT SOURCE APPARATUS

BACKGROUND OF THE INVENTION

1. Field of the Invention

The present invention relates to an optical amplifier module, which amplifies light to be amplified, and a laser light source apparatus comprising an optical amplifier module of this kind.

2. Related Background Art

Laser light sources which output light having a small spot size are required in industries such as ultrafine processing. In order to achieve practical use of a laser light source of this kind in an industrial application, and in particular, the processing of semiconductors and electrical components, it is necessary to shorten the pulse and raise the output of the laser light. In other words, it is necessary to achieve a laser light source having a pulse width of the nanosecond order which outputs light having a peak power exceeding a kW.

In order to achieve a laser light source which outputs light having a small spot size, a laser light source of a type in which the actual optical amplification medium forms a waveguide structure can be adopted. However, in the case of a laser light source of this kind, it is necessary to adopt a waveguide structure having a length of at least several meters, and therefore propagation delay occurs. As a result of this, in a laser light source having a resonance structure, such as a Q switch, the pulse width reaches 100 ns.

In order to resolve the aforementioned problem and shorten the pulse of the laser light to a pulse width of 10 ns or 1 ns, or lower, a Master Oscillator Power Amplifier (MOPA) structure is used in which a mode-locked solid-state laser light source, or a directly modulated laser diode is employed as a seed light source and the output power from this source is amplified in a single pass. A MOPA structure which amplifies light by using a directly modulated laser diode as a seed light source is employed in particular with a view to reducing costs and raising the freedom of the pulse cycle.

On the other hand, in order to raise the laser light output, since there exists no level above level 2 relating to lasing transitions, various methods are employed which involve doping the optical waveguide region with ytterbium (Yb) that does not produce absorption through up-conversion, as well as suppressing photodarkening.

The technology described above is explained in Japanese Patent Application Laid-open No. 2007-194501 (Document 1) and U.S. Patent Application Publication No. 2007-0053400 (Document 2), for example.

Document 1 discloses an optical amplifier module which uses a Yb-doped fiber (hereinafter referred to as YbDF) having a low Yb element concentration in the portion of high population inversion ratio, and uses a YbDF having a low Yb element concentration in the portion of low population inversion ratio. More specifically, Document 1 discloses an optical amplifier module comprising a first optical amplification medium having a core region doped with Yb, and a second optical amplification medium fusion spliced to the first optical amplification medium and having a core region doped with Yb at a higher concentration than the first optical amplification medium, wherein light to be amplified which is inputted to the first optical amplification medium is amplified respectively by the first and second optical amplification media.

Furthermore, Document 2 discloses a fiber laser light source comprising a first fiber section doped with Yb at a relatively low concentration and a second fiber section doped with Yb at a relatively high concentration, wherein light to be amplified which is inputted to the first fiber section is amplified respectively by the first and second fiber sections.

SUMMARY OF THE INVENTION

The present inventors have examined the above prior art, and as a result, have discovered the following problems. That is, in the optical amplifier module and fiber laser light source disclosed in Document 1 and Document 2, the dopant concentration of Yb in the optical amplification waveguide (the optical amplification medium or fiber section) is reduced in order to suppress photodarkening. However, since these prior art technologies use a low-concentration TbDF, then the overall length of the YbDF becomes long, which is disadvantageous in terms of housing the element and reducing costs, and so on. Consequently, there has been a problem in that it is not possible to achieve both effective suppression of photodarkening and efficient optical amplification.

The present invention has been developed to eliminate the problems described above. It is an object of the present invention to provide an optical amplifier module and a laser light source apparatus comprising a structure for achieving effective suppression of photodarkening and efficient optical amplification.

In order to resolve the problems described above, the optical amplifier module according to the present invention comprises a first optical amplification waveguide, a second optical amplification waveguide optically coupled to the first optical amplification waveguide, and a pumping unit. The first optical amplification waveguide and the second optical amplification waveguide are arranged such that the light to be amplified is propagated in the first optical amplification waveguide and then the second optical amplification waveguide successively, and the pumping unit supplies pumping light respectively to the first and second optical amplification waveguides. Furthermore, the first optical amplification waveguide is comprised of a silica glass as a main component and includes a ytterbium-doped first optical waveguide which is co-doped with phosphorous (P). The second optical amplification waveguide includes a ytterbium-doped second optical waveguide which is co-doped with aluminium (Al). The light to be amplified inputted to the first optical amplification waveguide is amplified only once by means of the pumping light in the first optical amplification waveguide and the second optical amplification waveguide, respectively.

In a further composition of the optical amplifier module according to the present invention, the first optical amplification waveguide may be comprised of a phosphate glass as a main component and include a ytterbium-doped first optical waveguide region. In this composition also, the second optical amplification waveguide includes a ytterbium-doped second optical waveguide region which is co-doped with Al.

In the optical amplifier module according to the present invention which has a composition such as that described above, a second optical amplification waveguide including a ytterbium-doped second optical waveguide region which is co-doped with Al is provided in the portion where the population inversion ratio is low, and a first optical amplification waveguide including a ytterbium-doped first optical waveguide region which includes P is provided in the portion where the population inversion ratio is high. In this way, by disposing a second optical amplification waveguide which has a high pumping efficiency in the portion having a low population inversion ratio (the side of the amplified light output terminal) which is principal in determining the pumping efficiency of the optical amplifier module (the power ratio of the light to be amplified with respect to the inputted pumping power), it is possible to avoid deterioration in the pumping efficiency of the optical amplifier module.

By disposing a first optical amplification waveguide which has a relatively low population inversion ratio in the portion where photodarkening is liable to occur due to a high population inversion ratio (the side of the input terminal of the light to be amplified), it is possible to suppress photodarkening effectively. Furthermore, the optical amplifier module relating to the present invention has a composition for amplifying the light to be amplified further in the second optical amplification waveguide, after it has been amplified in the first optical amplification waveguide. Therefore, the first optical amplification waveguide has low Amplified Spontaneous Emission (ASE). In an optical amplifier module which amplifies the light in multiple stages by means of a plurality of optical amplification waveguides arranged in series, as in the optical amplifier module according to the present invention, a wavelength selector element is normally disposed between the nearest-end optical amplification waveguide and the last-stage optical amplification waveguide, in order to remove noise components, such as ASE. However, in this optical amplifier module, since the light to be amplified is inputted to the first optical amplification waveguide which has low ASE, then it is possible to obtain similar beneficial effects to those of a case where a wavelength selector element is provided, without using a wavelength selector.

Since the light that has been amplified in the first optical amplification waveguide which has low ASE is further amplified in the second optical amplification waveguide which has high pumping efficiency, efficient amplification of the light to be amplified can be achieved. Consequently, In accordance with the optical amplifier module according to the present invention, it is possible to achieve both effective suppression of photodarkening and efficient optical amplification.

Furthermore, it is desirable to use respective ytterbium-doped optical fibers for the first optical amplification waveguide and the second optical amplification waveguide. By using easily procured YbDF for the first and second optical amplification waveguides in this way, the manufacture of the optical amplification waveguide having the composition described above is facilitated.

Moreover, in order to thoroughly prevent photodarkening at the same time as maintaining pumping efficiency, in the optical amplifier module according to the present invention, it is possible further to dope the second optical waveguide region in the second optical amplification waveguide with P. In this case, in the second waveguide region, the non-saturated absorption with respect to 915 nm-band pumping light (hereinafter, called "non-saturated absorption of 915 nm-band pumping light") is desirably lower than the non-saturated absorption of 915 nm-band pumping light in the first optical amplification waveguide.

Furthermore, in order to improve the noise factor of the module as a whole, the optical amplification waveguide according to the present invention may further comprise an optical filter which is disposed to the upstream side of the first optical amplification waveguide in terms of the direction of propagation of the light to be amplified, and a third optical amplification waveguide which is disposed to the upstream side of the optical filter in terms of the direction of propagation of the light to be amplified. The optical filter is an optical component which transmits only the wavelength component of the light to be amplified but attenuates other wavelength components. Furthermore, desirably, the third optical amplification waveguide includes a ytterbium-doped third optical waveguide region which is co-doped with Al and is not co-doped with P, and the non-saturated absorption of 915 nm-band pumping light in this region is one half or less of that of the second optical waveguide region.

Desirably, the laser light source apparatus according to the present invention comprises an optical amplifier module having a structure such as that described above (an optical amplifier module according to the present invention) and a laser diode which outputs light to be amplified having a pulse width in the range of 1 ns to 100 ns and a central wavelength in the range of 1062 nm to 1072 nm. By means of this composition, it is possible to achieve effective suppression of photodarkening and efficient optical amplification, while setting the region of the central wavelength of the outputted laser light to around 1064 nm which is similar to that of existing YAG lasers.

DESCRIPTION OF THE PREFERRED EMBODIMENTS

In the following, embodiments of the optical amplification module and laser light source apparatus according to the present invention will be explained in detail with reference to FIGS. 1 to 10. In the description of the drawings, identical or corresponding components are designated by the same reference numerals, and overlapping description is omitted.

Figure 1:
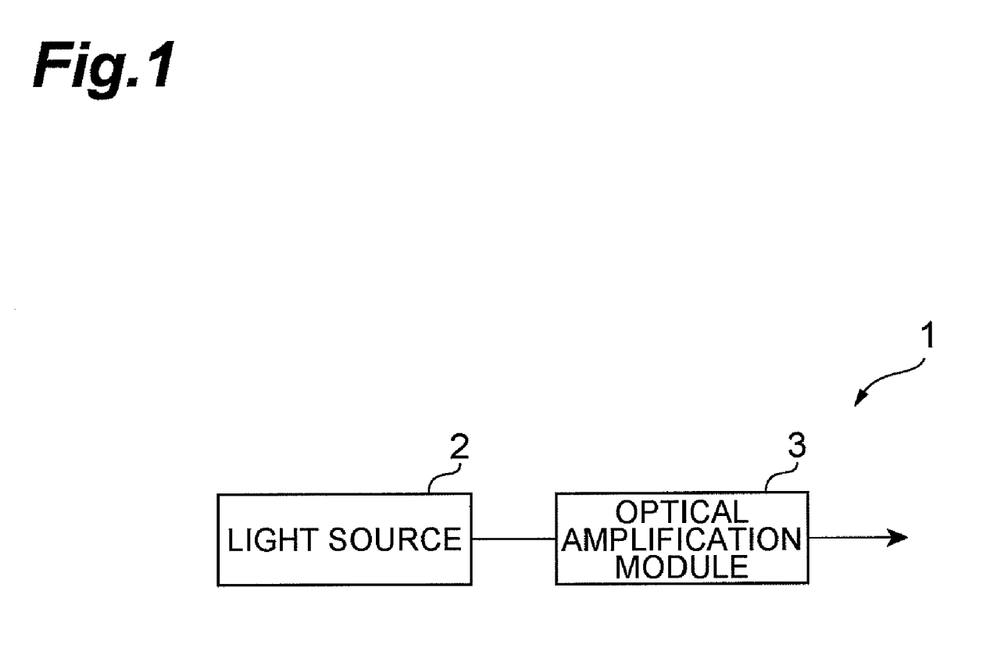
FIG. 1 is a diagram showing the approximate composition of one embodiment of a laser light source apparatus according to the present invention.

FIG. 1 is a diagram showing the approximate composition of one embodiment of a laser light source apparatus according to the present invention. In FIG. 1, the laser light source apparatus 1 uses a MOPA composition and comprises a laser light source 2 and an optical amplifier module 3. The laser light source 2 includes a laser diode which is temperature controlled so as to output light to be amplified having a pulse width in the range of 1 ns to 100 ns and a central wavelength of 1064 nm. In other words, in the case of a laser diode, since the wavelength of the outputted light can be changed readily by means of the chip temperature and modulation current, then the temperature of the laser light source 2 is adjusted in such a manner that if the central wavelength of the light to be amplified is greater than 1065 nm, the laser chip is cooled, and if conversely it is shorter than 1064 nm, then the laser chip is heated.

First Embodiment of Optical Amplifier Module

The optical amplifier module 3 amplifies the light to be amplified which is outputted from the laser light source 2. In the laser light source apparatus 1 (FIG. 1), the light to be amplified that is outputted from the laser light source 2 is outputted after being amplified by the optical amplifier module 3.

Figure 2:
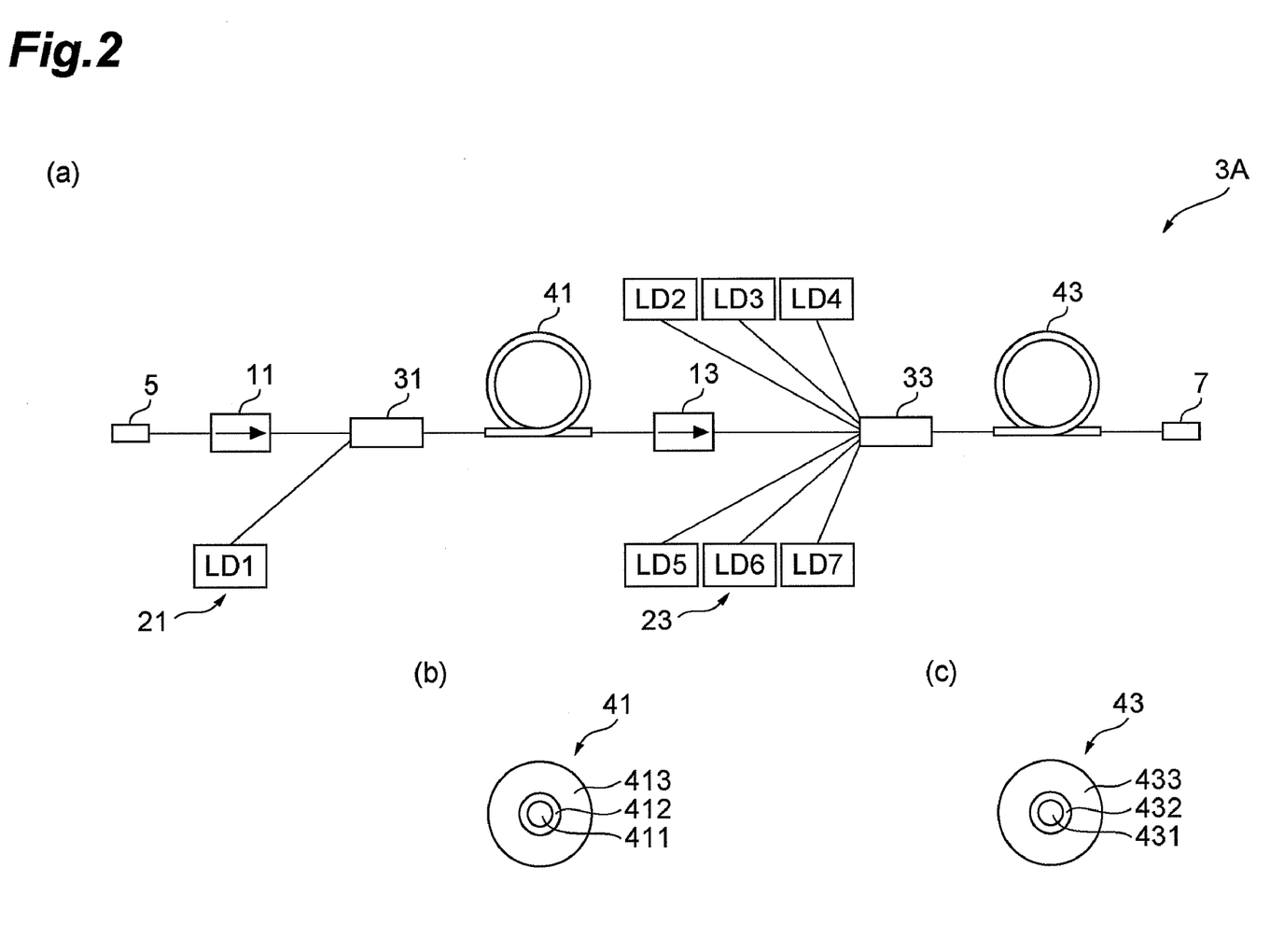
FIG. 2 is a diagram showing the composition of an optical amplifier module which can be used in the laser light source apparatus shown in FIG. 1 (a first embodiment of the optical amplifier module according to the present invention)

FIG. 2 is a diagram showing the composition of a first embodiment of an optical amplifier module according to the present invention. As shown in the area (a) of FIG. 2, the optical amplifier module 3A relating to the first embodiment inputs light to be amplified that is outputted from the laser light source 2, via an input terminal 5, and amplifies and then outputs this light to be amplified via the output terminal 7. More specifically, the optical amplifier module 3A comprises an input terminal 5 and an output terminal 7, and also comprises optical isolators 11, 13, pumping light source units (pumping units) 21, 23, an optical coupler 31, a optical combiner 33, a first optical amplification waveguide 41 and a second optical amplification waveguide 43. Furthermore, the optical isolator 11 which receives the inputted light from the input terminal 5, the optical coupler 31, the first optical amplification waveguide 41, the optical isolator 13, the optical combiner 33 and the second optical amplification waveguide 43 are disposed in this order from the input terminal 5 toward the output terminal 7. The pumping light source units 21 and 23 are connected respectively to the optical coupler 31 and the optical combiner 33.

The optical isolators 11 and 13 respectively transmit light in the forward direction from the input terminal 5 toward the output terminal 7, and shut off light in the reverse direction. The optical coupler 31 outputs the light to be amplified which has arrived from the optical isolator 11, to the first optical amplification waveguide 41, as well as outputting the pumping light which has arrived from the pumping light source unit 21 to the first optical amplification waveguide 41. The optical combiner 33 outputs the light to be amplified which has arrived from the optical isolator 13 (the amplified light from the first optical amplification waveguide 41), to the second optical amplification waveguide 43, as well as outputting the pumping light which has arrived from the pumping light source unit 23 to the second optical amplification waveguide 43.

The first optical amplification waveguide 41 is comprised of a phosphate glass as a main component, and as shown in the area (b) of FIG. 2, comprises a core region 411 (first optical waveguide region), a first cladding region 412 which surrounds the core region 411, and a second cladding region 413 which surrounds the first cladding region 412. The first optical amplification waveguide 41 is a YbDF in which at least a portion of the core region 411 is doped with Yb. The light to be amplified and the pumping light outputted from the optical coupler 31 are inputted to the first optical amplification waveguide 41. In this first optical amplification waveguide 41, the light to be amplified which is propagated in single mode in the core region 411 is amplified by being pumped by the pumping light which is propagated in multimode in the first cladding region 412, and this amplified light is outputted to the optical isolator 13.

The second optical amplification waveguide 43 is comprised of a silica glass as a main component, and as shown in the area (c) of FIG. 2, comprises a core region 431 (second optical waveguide region), a first cladding region 432 which surrounds the core region 431, and a second cladding region 433 which surrounds the first cladding region 432. The second optical amplification waveguide 43 is a YbDF in which at least a portion of the core region 431 is co-doped with Al and Yb. The pumping light and the outputted light being amplified by the first optical amplification waveguide 41 are inputted to the second optical amplification waveguide 43 from the optical combiner 33. In this second optical amplification waveguide 43, the amplified light outputted from the first optical amplification waveguide 41 propagates in single mode in the core region 431, but in so doing it is further amplified by being pumped by the pumping light which propagates in multi-mode in the first cladding region 432.

The pumping light source unit 21 is constituted by a laser diode LD1 which outputs the pumping light that is to be supplied to the first optical amplification waveguide 41 (for example, light in the 975 nm waveband and 6 W power rating). The output power of the laser diode LD1 is set to a value at which photodarkening does not occur in the first optical amplification waveguide 41. Since the first optical amplification waveguide 41 is comprised of a phosphate glass as a main component and includes P, then it is possible to set the output power of the laser diode LD1 higher than in a case where it does not contain P.

The pumping light source unit 23 is constituted by six single-mode pumping laser diodes LD2 to 7, and these respective laser diodes LD2 to 7 output pumping light that is to be supplied to the second optical amplification waveguide 43 (for example, light in the 975 nm waveband and power rating of 7 W).

The optical amplifier module 3 uses a cladding-pumped system, and the prescribed current of the pumping laser diodes LD1 to LD7 used as pumping light sources is several amps to several tens of amps, and therefore a large amount of heat is generated. Consequently, the wavelength of the pumping light becomes instable due to temperature changes, and if the wavelength of the pumping light changes, then this leads to significant deterioration in the absorption efficiency and ultimately gives rise to deterioration of the power conversion efficiency. Consequently, it is desirable for the laser diodes LD1 to 7 to comprise high-performance electronic cooling units.

The pumping light source units 21 and 23, the optical coupler 31 and the optical combiner 33 supply pumping light to the first optical amplification waveguide 41 and the second optical amplification waveguide 43.

Figure 3:
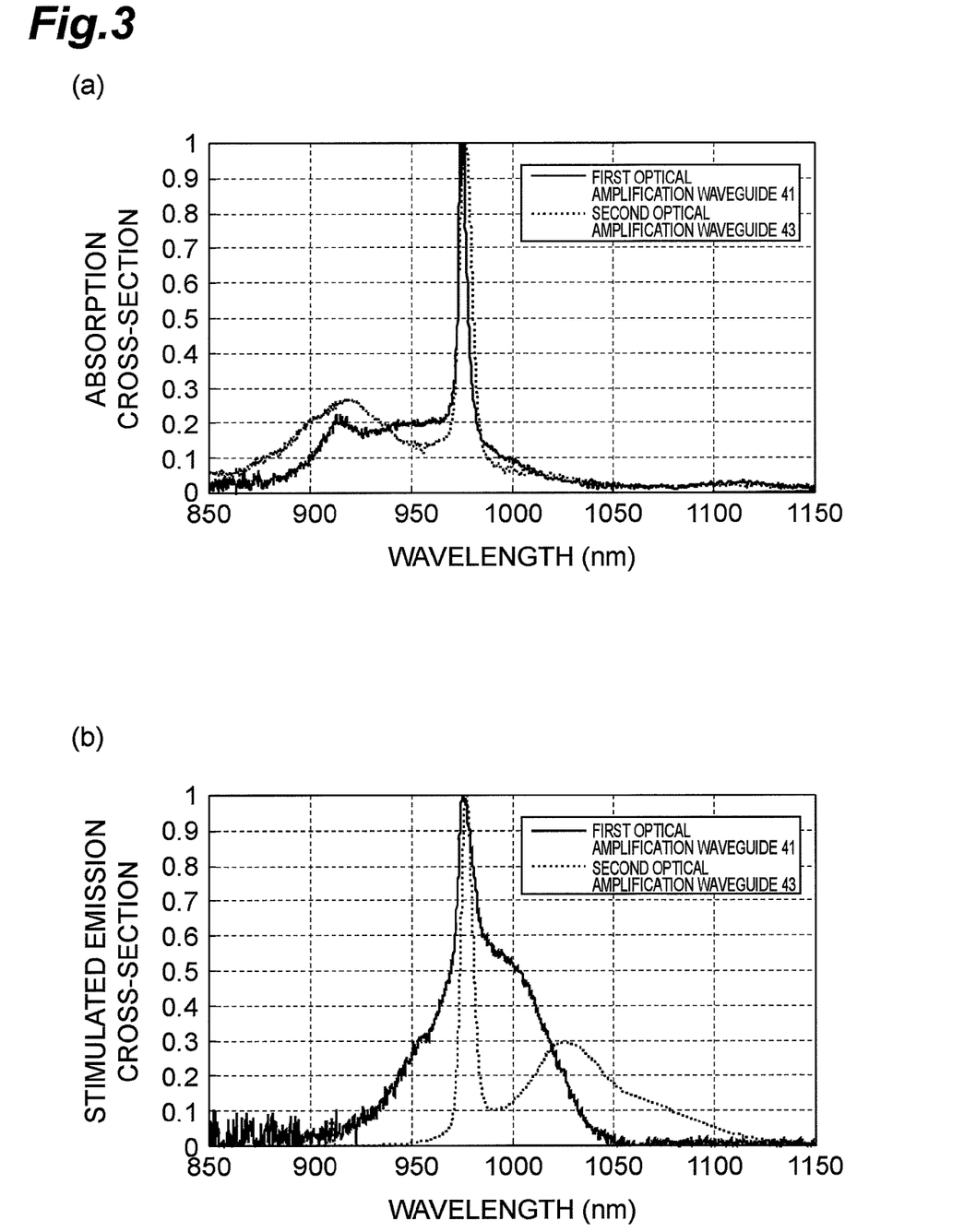
FIG. 3 shows the respective absorption cross-section spectra and stimulated emission cross-section spectra of the first optical amplification waveguide 41 and the second optical amplification waveguide 43.

FIG. 3 shows the respective absorption cross-section spectra and stimulated emission cross-section spectra of the first optical amplification waveguide 41 and the second optical amplification waveguide 43. In particular, the area (a) of FIG. 3 shows the respective absorption cross-section spectra of the first optical amplification waveguide 41 and the second optical amplification waveguide 43, and the area (b) of FIG. 3 shows the respective stimulated emission cross-section spectra of the first optical amplification waveguide 41 and the second optical amplification waveguide 43. These spectra are normalized by taking the main peak value in the vicinity of the wavelength 975 nm as 1. As shown in the areas (a) and (b) of FIG. 3, the first optical amplification waveguide 41 and the second optical amplification waveguide 43 both have a high absorption peak in the 975 nm waveband. Furthermore, compared to the first optical amplification waveguide 41, the second peak of the stimulated emission cross-section of the second optical amplification waveguide 43 is toward the longer wavelength side. In the case of first optical amplification waveguide 41, the absorption cross-section is flat over a wide range and the selectivity of the pumping wavelength is relaxed, but the stimulated emission cross-section almost completely reaches zero in the vicinity of the wavelength 1064 nm. Therefore, the second optical amplification waveguide 43 is more beneficial than the first optical amplification waveguide 41 in terms of pumping efficiency at the central wavelength of 1064 nm of the light to be amplified.

The optical amplifier module 3 having this composition operates in the following manner.

pumping light in the 975 nm waveband which is outputted from the laser diode LD1 constituting the pumping light unit 21 is supplied to the first optical amplification waveguide 41 via the optical coupler 31. On the other hand, pumping light components in the 975 nm waveband which are outputted respectively from the six laser diodes LD2 to 7 constituting the pumping light source unit 23 are supplied to the second optical amplification waveguide 43 via the optical combiner 33.

The light to be amplified having a central wavelength of 1064 nm which is introduced at the input terminal 5 is inputted to the first optical amplification waveguide 41 via the optical isolator 11 and the optical coupler 31 and is amplified in the first optical amplification waveguide 41. The light that has been amplified in the first optical amplification waveguide 41 is input to the second optical amplification waveguide 43 via the optical isolator 13 and the optical combiner 33. The second optical amplification waveguide 43 further amplifies the inputted light. The light which has been amplified in the second optical amplification waveguide 43 is outputted via the output terminal 7.

In the optical amplifier module 3A relating to the first embodiment, a second optical amplification waveguide 43 having a Yb-doped core region 431 which is co-doped with Al is disposed in the portion having low population inversion ratio (the output terminal 7 side of the optical amplifier module 3A), and a first optical amplification waveguide 41 comprised of a phosphate glass as a main component of phosphate glass and having a Yb-doped core region 411 is disposed in the portion having a high population inversion ratio (the input terminal 5 side of the optical amplifier module 3A). By disposing a second optical amplification waveguide 43 having a high pumping efficiency in the portion having low population inversion ratio (the output terminal 7 side of the optical amplifier module 3A) which is principal in determining the pumping efficiency of the optical amplifier module 3A, it is possible to avoid deterioration of the pumping efficiency of the optical amplifier module 3A.

Furthermore, by disposing a first optical amplification waveguide 41 which has a relatively low population inversion ratio in the portion where photodarkening is liable to occur due to the high population inversion ratio, it is possible to suppress photodarkening effectively. Furthermore, this optical amplifier module 3A employs a composition in which the light to be amplified is amplified in the first optical amplification waveguide 41, and the light amplified by this first optical amplification waveguide 41 is then further amplified in the second optical amplification waveguide 43. Moreover, this first optical amplification waveguide 41 has low ASE. In an optical amplifier module which amplifies the light in multiple stages by means of a plurality of optical amplification waveguides arranged in series, as in the optical amplifier module 3A relating to this first embodiment, a wavelength selector element is normally disposed between the nearest-end optical amplification waveguide and the last-stage optical amplification waveguide, in order to remove noise components. In many cases, this wavelength selector element uses a bandpass filter (hereinafter BPF) constituted by a multi-layer dielectric film. In applications requiring high power, such as laser processing, or the like, there is a high risk that the BPF will be broken by optical damage, even though it is located at an intermediate position in the optical amplifier module. However, in this optical amplifier module 3A, since the light to be amplified is inputted to the first optical amplification waveguide 41 which has low ASE, then it is possible to obtain similar beneficial effects to those of a case where a wavelength selector element is provided, without using a wavelength selector which is liable to be broken by optical damage.

Furthermore, in this optical amplifier module 3A, it is possible to achieve more efficient light amplification since the light amplified in the first optical amplification waveguide 41 having low ASE is then further amplified in the second optical amplification waveguide 43 which has a high pumping light ratio. In this way, by means of the optical amplifier module 3A, it is possible to achieve both effective suppression of photodarkening and effective optical amplification. Furthermore, by means of the optical amplifier module 3A, since the light to be amplified having a central wavelength of 1064 nm is amplified by pumping using pumping light, then it is possible to apply selective gain to the 1064-nm light to be amplified which is equivalent to that of an existing YAG laser.

Modification Example

Next, a modification example of the optical amplifier module 3A relating to the first embodiment is described. The optical amplifier module relating to the modification example has a different composition of the first optical amplification waveguide 41, but the remainder of the composition is the same as the optical amplifier module 3A relating to the first embodiment shown in the area (a) of FIG. 2. The first optical amplification waveguide 41 according to the modification example is a Yb-doped fiber which is comprised of a silica glass as a main component and comprises a core region 411 (first waveguide region), a first cladding region 412 surrounding the core region 411 and a second cladding region 413 surrounding the first cladding region 412. Furthermore, at least a portion of the core region 411 is co-doped with ytterbium and P at 20 wt % concentration or above.

The optical amplifier module relating to the present modification only differs from the optical amplifier module 3A according to the first embodiment in terms of the composition of the first optical amplification waveguide 41, but this first optical amplification waveguide 41 is similar to the first optical amplification waveguide 41 of the first embodiment in that at least a portion of the core region 411 is co-doped with Yb and P. Consequently, it is possible to obtain similar beneficial effects to the optical amplifier module 3A relating to the first embodiment, by means of the optical amplifier module relating to the present modification.

Practical Example 1

Below, the present invention is described in further detail with reference to practical examples, but the present invention is not limited to these practical examples.

Practical Example 1

The fiber according to Practical Example 1 is a Yb-doped fiber (hereinafter referred to as "YbDF-A" below) which can be used as the first optical amplification waveguide 41 of the respective embodiments of the present invention. The YbDF-A is a Yb-doped fiber is comprised of a phosphate glass as a main component and includes 26.4 wt % of P and 0.8 wt % of Al, a core diameter of 10 μm, a first cladding diameter of 125 μm, a 1.8 dB/m non-saturated absorption of 915 nm-waveband pumping light, and a length of 8 m. Furthermore, the Yb weight concentration in the YbDF-A is 47000 wt-ppm.

Practical Example 2

The fiber according to Practical Example 2 is a Yb-doped fiber (hereinafter referred to as "YbDF-B") which can be used as the second optical amplification waveguide 43 of the respective embodiments of the present invention. The YbDF-B is a Yb-doped fiber is comprised of a silica glass as a main component, and a core region doped with 1.5 wt % Al; the core diameter is 10 μm, the first cladding diameter is 125 μm, the non-saturated absorption of 915 nm-waveband pumping light is 1.5 dB/m, and the length is 10 m. The total absorption of pumping light of the YbDF-A and the YbDF-B was almost the same in either case. The second cladding of the Yb-doped fiber A and the Yb-doped fiber B is not doped with an impurity such as P or Al, in either case. Furthermore, the Yb weight concentration in the YbDF B is 12000 wt-ppm.

Practical Example 3

The fiber according to Practical Example 3 is a Yb-doped fiber (hereinafter referred to as "YbDF-C") which can be used as the second optical amplification waveguide 43 of the respective embodiments of the present invention. The YbDF-C is a Yb-doped fiber is comprised of a silica glass as a main component and a core region which is co-doped with 4.6 wt % of Al and 4.1 wt % of P; the core diameter is 10 μm, its length is 4 m, the first cladding diameter is approximately 125 to 128 μm (the cross-section of the first cladding has an octagonal shape), and the non-saturated absorption of 915 nm-waveband pumping light is 1.5 dB/m. Furthermore, the Yb weight concentration in the YbDF-C is 19000 wt-ppm. The YbDF-C according to Practical Example 3 has a core region which is co-doped with Al and P, but the concentration of P may be approximately ⅕ of the P concentration in the YbDF-B in Practical Example 2 described above.

The non-saturated absorption of 915 nm-band pumping light corresponds to the Yb weight concentration, and the non-saturated absorption of 915 nm-band pumping light is approximately the same in each of the YbDF-A to YbDF-C above.

Experimental Example 1

An experiment for evaluating pumping efficiency was carried out for the Yb-doped fiber A according to Practical Example 1 and the Yb-doped fiber B according to Practical Example 2.

(Common Conditions)

Figure 4:
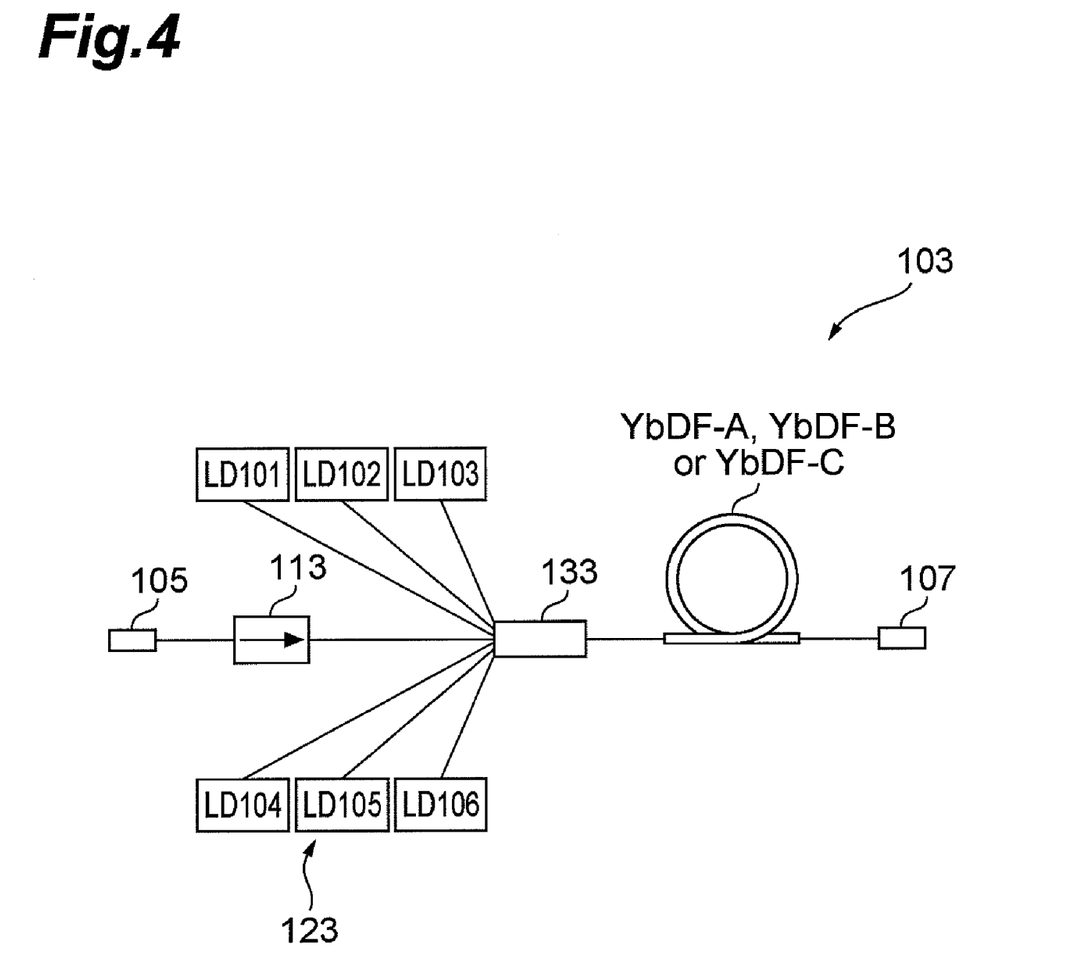
FIG. 4 is a conceptual diagram showing an optical amplifier module 103 which is used in Experimental Example 1.

FIG. 4 is a conceptual diagram showing an optical amplifier module 103 which is used in Experimental Example 1. As shown in FIG. 4, the optical amplifier module 103 comprises an optical isolator 113 and an optical combiner 133 which are disposed in sequence from the input terminal 105 to the output terminal 107, and a pumping light source unit 123 constituted by six pumping laser diodes LD101 to 106 is connected to the optical combiner 133. The optical isolator 113 is used in order to prevent inversion of the light to be amplified having a central wavelength of 1060 nm. Furthermore, the optical combiner 133 has an input terminal consisting of six multi-mode fibers, and an output terminal consisting of one dual-cladding fiber. The pumping light outputted from the laser diodes LD101 to 106 is inputted respectively to the six multi-mode fibers which function as the input terminal, and is outputted from the output terminal. The laser diodes LD101 to 106 respectively output pumping light having a central wavelength of 975 nm. In the present experimental example, the same drive current was supplied to the respective laser diodes LD101 to 106 in such a manner that the output power was the same. When the drive current was 8 A, then the output power of each of the laser diodes LD101 to 106 was 7 W.

In the present experimental example, a YbDF-A or a YbDF-B is disposed between the output terminal of the optical combiner 133 and the output terminal 107 of the optical amplifier module 103. With one or other of the fibers disposed in position, 1060 nm-band light to be amplified of 2 W was inputted and the pumping was carried out in the forward direction by the laser diodes LD101 to 106, and the resulting output power of the amplified light outputted from the output terminal 107 was measured.

(Evaluation and Results)

Figure 5:
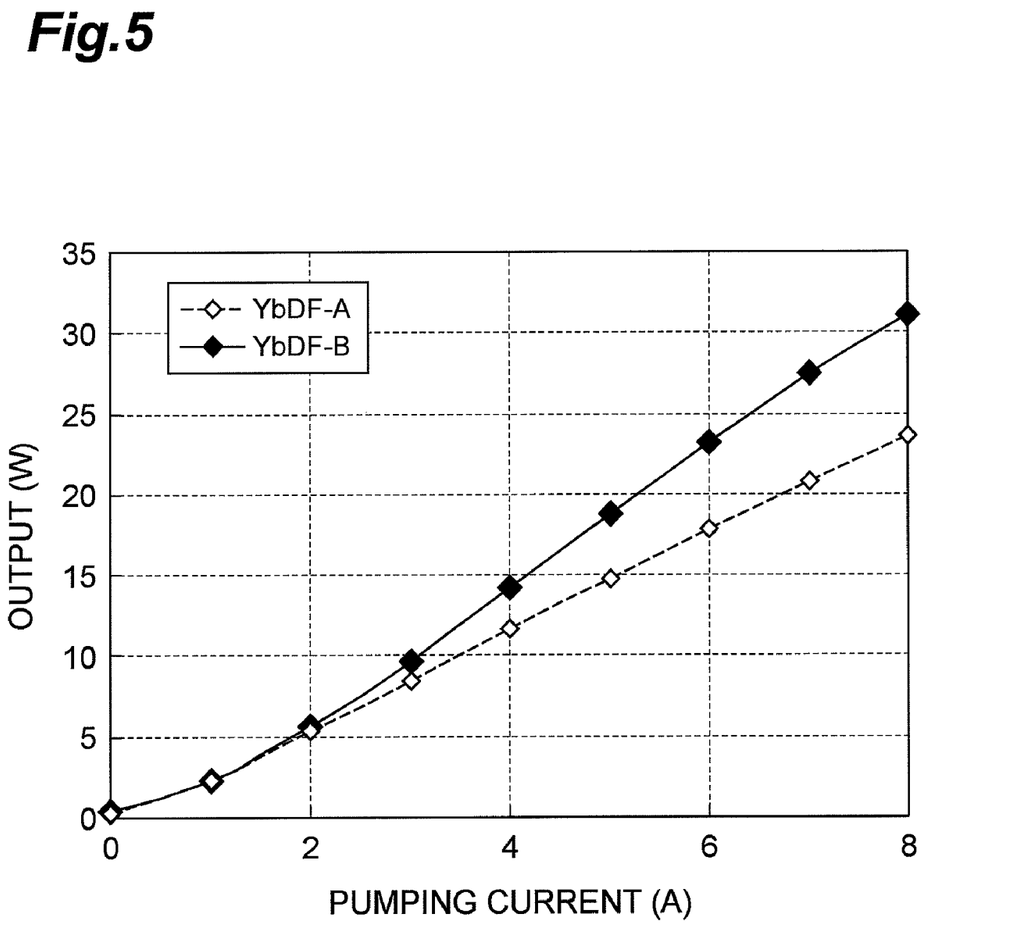
FIG. 5 is a diagram showing the relationship between the drive current supplied respectively to laser diodes, and the output power of amplified light, as obtained from Experimental Example 1.

FIG. 5 shows the relationship between the drive current supplied respectively to the laser diodes LD101 to 106 and the output power of the amplified light obtained from the present experimental example. As shown in FIG. 5, when the pumping current supplied to the respective laser diodes LD101 to 106 was 8 A (in other words, when the total pumping power was 40 mW), the output power of the amplified light that is outputted from the YbDF-B was 31 W and the output power of the amplified light that is outputted from the YbDF-A was 23.6 W. In other words, when the total pumping power was 40 mW, the pumping light ratio of the YbDF-A was restricted to 75% of the pumping light ratio of the YbDF-B. Consequently, it was confirmed that from the viewpoint of the pumping light ratio, the YbDF-B which can be used as the second optical amplification waveguide 43 is more beneficial than the YbDF-A which can be used as the first optical amplification waveguide 41.

Experimental Example 2

An experiment for evaluating the ASE spectrum was carried out for the YbDF-A according to Practical Example 1 and the YbDF-B according to Practical Example 2.

(Common Conditions)

The ASE spectra of the YbDF-A and the YbDF-B were measured using the optical amplifier module 103 of Experimental Example 1 and setting the power of the light to be amplified to zero.

(Evaluation and Results)

Figure 6:
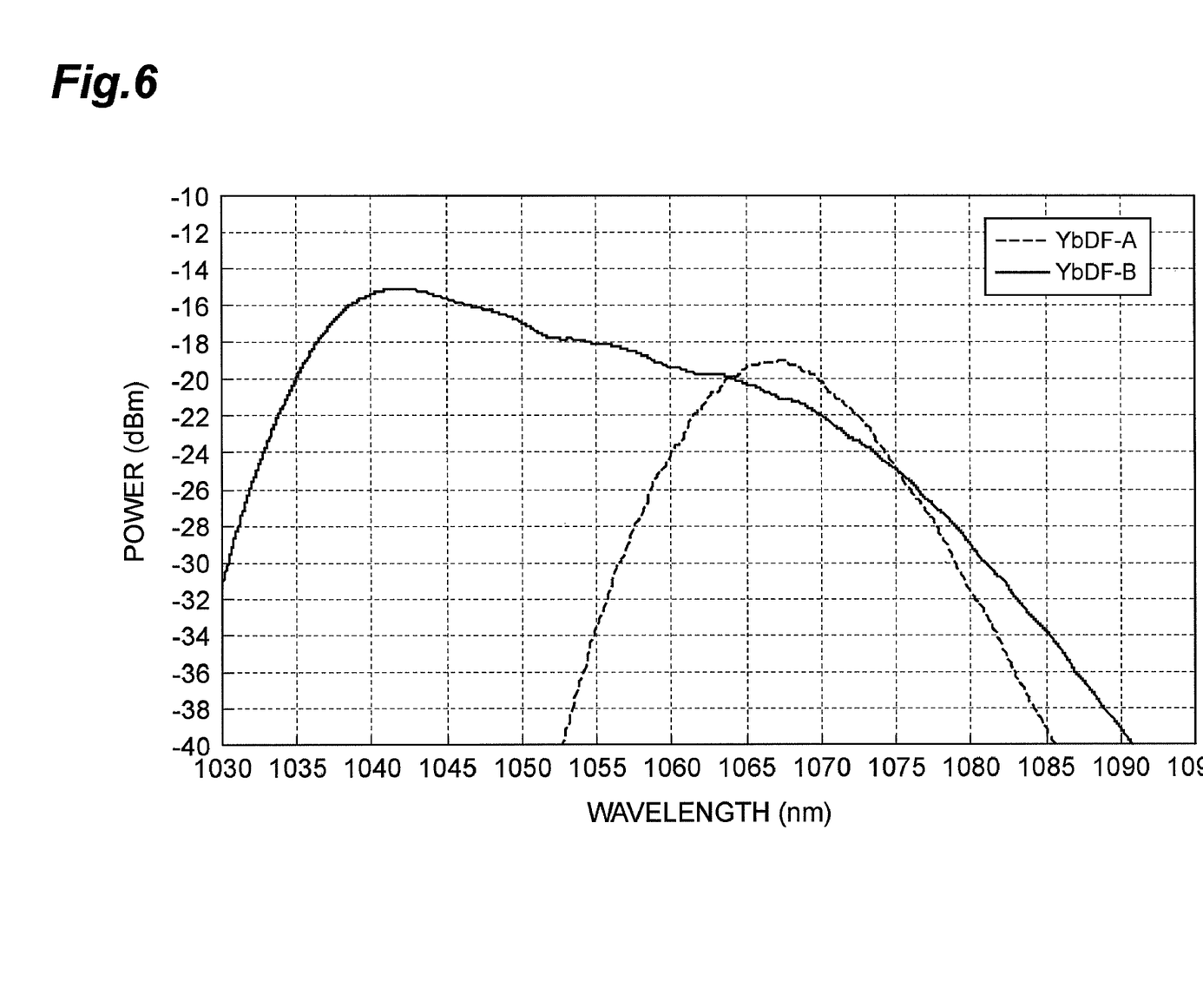
FIG. 6 is a diagram showing the ASE spectra of a YbDF-A and a YbDF-B.

The ASE spectra of the YbDF-A and the YbDF-B obtained from the present experimental example are shown in FIG. 6. As shown in FIG. 6, the YbDF-B also has gain in the 1040 nm region, as well as the 1064 nm region, and shows ASE over a broad waveband. On the other hand, the 3 dB band of the YbDF-A is limited to 1062 to 1072 nm, and the total power of ASE was approximately ¼ that of the YbDF-B. By means of this experimental example, it was confirmed that the YbDF-A has low ASE and has a function like that of a BPF.

Experimental Example 3

An experiment for evaluating background loss was carried out for the YbDF-A according to Practical Example 1 and the YbDF-B according to Practical Example 2.

(Common Conditions)

In a state where no light to be amplified was inputted, the background loss was investigated, both before inputting pumping light and after pumping the YbDF-A and the YbDF-B respectively by inputting 975 nm-band pumping light in single mode for one hour at a power of 500 mW. In this experiment, the YbDF-A and the YbDF-B each had a length of 0.1 m.

(Evaluation and Results)

Figure 7:
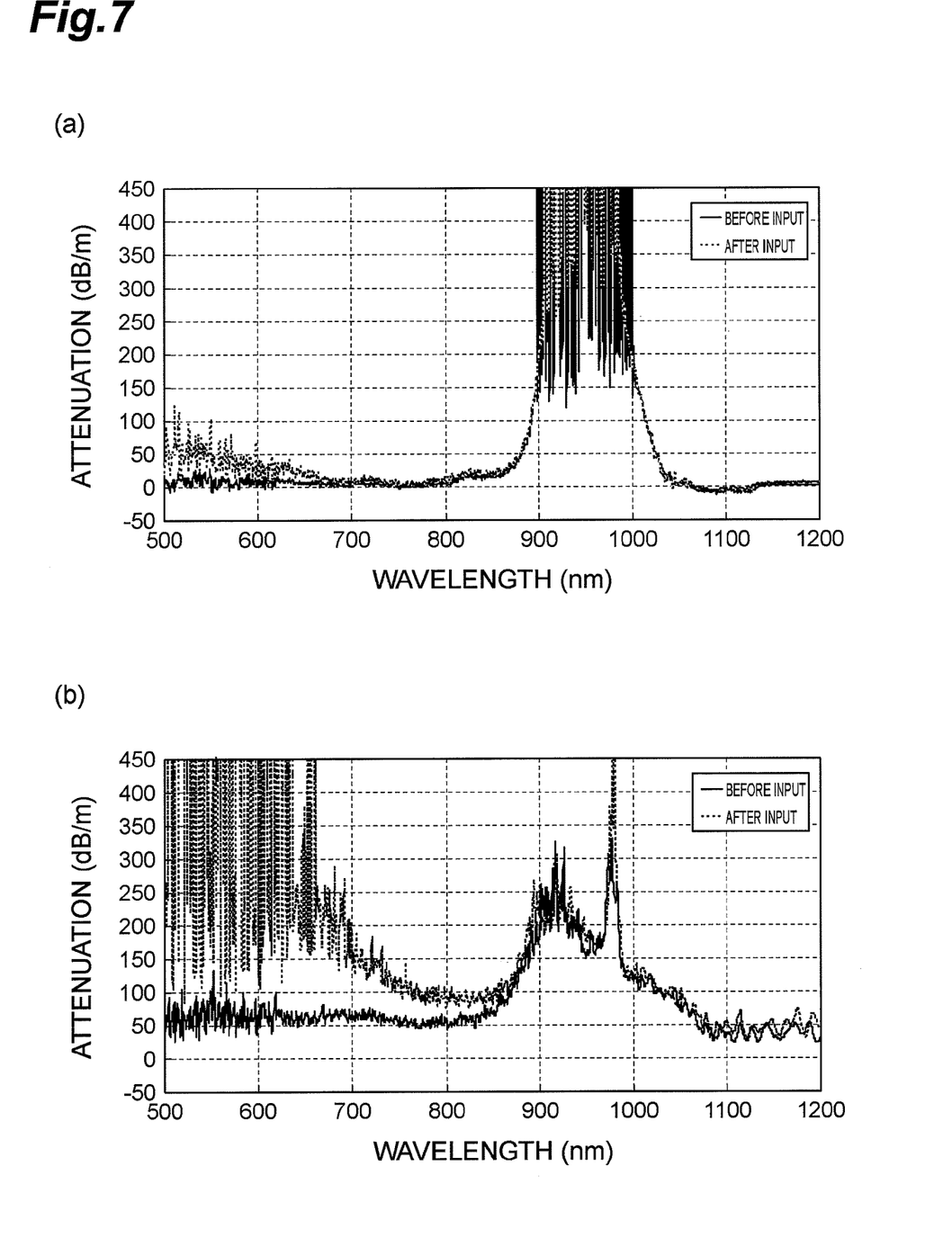
FIG. 7 is a diagram showing the background loss of a YbDF-A and a YbDF-B.

The background loss results of the YbDF-A and the YbDF-B obtained from the present experimental example are shown in FIG. 7. In particular, the area (a) of FIG. 7 shows the results of background loss of the YbDF-A according to Practical Example 1 and the area (b) of FIG. 7 shows the results of background loss of the YbDF-B according to the Practical Example 2. In the present experimental example, as shown in the areas (a) and (b) of FIG. 7, it was confirmed that increase in background loss was restricted to a greater extent in the YbDF-A (area (a) of FIG. 7) compared to the YbDF-B (area (b) of FIG. 7). In other words, it was confirmed that from the viewpoint of suppressing photodarkening, the YbDF-A is more beneficial than the YbDF-B.

Furthermore, from the Experimental Examples 1 to 3, it can be seen that due to the composition of the optical amplifier module 3A according to the first embodiment, even when pulse light having an extremely low duty ratio of 1/1000 (pulse width: 10 ns; repetition frequency: 100 kHz), for example, is inputted and the YbDF-A used as the first optical amplification waveguide 41 assumes a small signal state, the total ASE output is ¼ of that when using the YbDF-B, the gain of the second optical amplification waveguide 43 is approximately four times greater, and therefore a pulse peak almost four times greater is obtained.

When the YbDF-B is used as the second optical amplification waveguide 43 of the optical amplifier module 3, desirably, the second optical amplification waveguide 43 has sufficient length to absorb all of the pumping light sufficiently. More specifically, in order that the total non-saturated absorption of the pumping light becomes approximately 15 dB, the length should be approximately 10 m when the central wavelength of the pumping light is 915 nm, and it should be approximately 3.3 m when the wavelength of the pumping light is 975 nm.

Moreover, in the case of the YbDF-A according to Practical Example 1 and the YbDF-B according to Practical Example 2 described above, as shown in FIG. 4 and FIG. 5, even when the total absorption of the pumping light is approximately the same in either case, an output of 31 W is obtained with the YbDF-B according to Practical Example 2, whereas an output of only 23.6 W is obtained with the YbDF-A according to Practical Example 1. In other words, a pumping efficiency of only around 75% is obtained. On the other hand, as shown in the area (a) of FIG. 7, the YbDF-A according to Practical Example 1 has a merit in that virtually no photodarkening occurs in comparison with the YbDF-B according to Practical Example 2. The YbDF-C according to Practical Example 3 was prepared as a sample which combines the advantages of both of the fibers A and B.

Experimental Example 4

An experiment for evaluating pumping efficiency was carried out for the YbDF-B according to Practical Example 2 and the YbDF-C according to Practical Example 3.

(Common Conditions)

Similarly to the Experimental Example 1 described above, in this Experimental Example 4, a YbDF-B according to Practical Example 2 or a YbDF-C according to Practical Example 3 was disposed in the optical amplifier module 103 shown in FIG. 4, between the output terminal of the optical combiner 133 and the output terminal 107 of the amplifier. With either one or the other fiber disposed in position, 1060 nm-band light to be amplified of 2 W was inputted and the pumping was performed in the forward direction by the laser diodes LD101 to 106, and the resulting output power of the amplified light that is outputted from the output terminal 107 was measured. The length of the YbDF-B according to Practical Example 2 and the YbDF-C according to Practical Example 3 was 4 m in each case. Each of the six pumping laser diodes LD101 to 106 constituting the pumping light source unit 123 had an output power of 5 W at a drive current of 6 A. Furthermore, the outputted light of the pumping laser diodes LD101 to 106 supplied with a drive current of 6 A was 975±3 nm in each case.

(Evaluation and Results)

Figure 8:
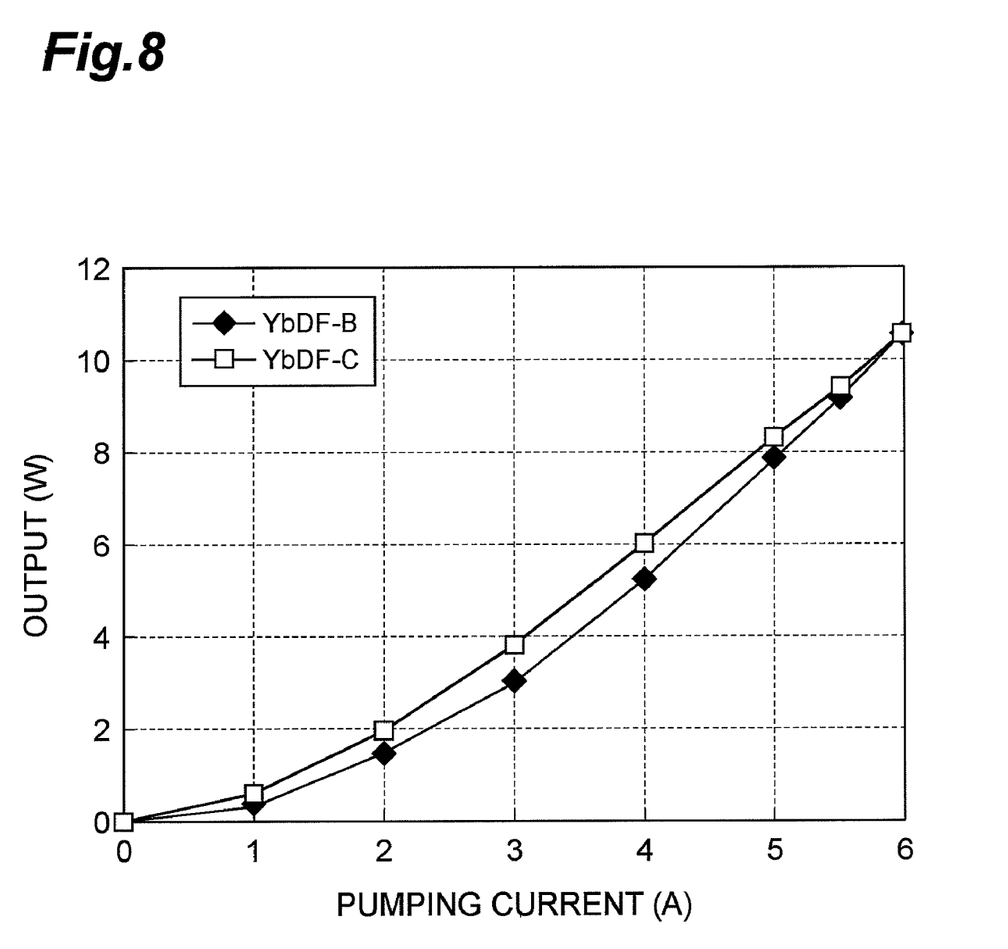
FIG. 8 is a diagram showing the relationship between the drive current supplied respectively to laser diodes, and the output power of amplified light, as obtained from Experimental Example 1.

In the optical amplifier module 103 shown in FIG. 4, when the power of the inputted light of wavelength 1060 nm was set to approximately 0.2 W, then as shown in FIG. 8, the respective output powers of the YbDF-B in Practical Example 2 and the YbDF-C in the Practical Example 3 were virtually the same.

Experimental Example 5

An experiment was carried out to evaluate background loss similarly to the Experimental Example 3, in the YbDF-C according to Practical Example 3.

(Common Conditions)

In a state where no light to be amplified was inputted, the background loss was investigated, both before inputting pumping light and after pumping the YbDF-C by inputting 975 nm-band pumping light in single mode for one hour at a power of 500 mW. In this experiment, the length of the YbDF-C was 0.05 m.

(Evaluation and Results)

Figure 9:
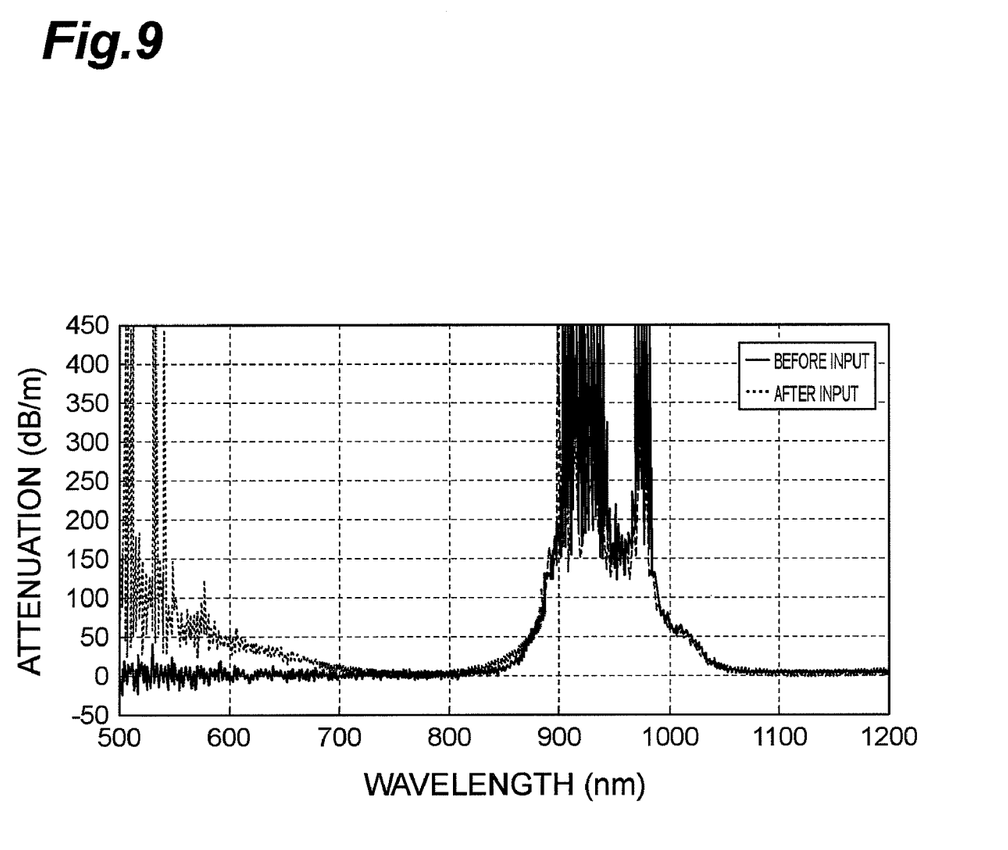
FIG. 9 is a diagrams showing the respective background loss of a YbDF-B and a YbDF-C.

As FIG. 9 reveals, the photodarkening in the YbDF-C according to Practical Example 3 showed intermediate characteristics between the areas (a) and (b) of FIG. 7, being slightly more pronounced than the YbDF-A according to Practical Example 1 (area (a) of FIG. 7). However, with regard to pumping efficiency, when the power of the 1060-nm inputted light in the optical amplifier module 103 shown in FIG. 4 was set to approximately 0.2 W, then the outputted light power when using the YbDF-B according to Practical Example 2 and the YbDF-C according to Practical Example C, both at a length of 0.05 m, was virtually the same, as shown in FIG. 8. In the optical amplifier module 3A relating to the first embodiment shown in FIG. 2, for example, which makes use of these characteristics of the YbDF-C according to Practical Example 3, the YbDF-A according to Practical Example 1 is used for the optical amplification waveguide 41 which has the greatest risk of photodarkening, while the YbDF-C according to Practical Example 3 can be used for the optical amplification waveguide 43 which determines the pumping efficiency, in other words, the output power of the light to be amplified with respect to the injected pumping power. In any case, using the YbDF-A according to Practical Example 1 on the upstream side where there is a large risk of photodarkening is desirable from the viewpoint of avoiding photodarkening.

Second Embodiment of Optical Amplifier Module

In the optical amplifier module 3A relating to the first embodiment described above, the waveband of the pumping light is desirably 1064 nm, which is the same as existing YAG lasers, but as shown in the area (b) of FIG. 3, the stimulated emission cross-section of the YbDF-A according to Practical Example 1 is almost zero at a wavelength of 1064 nm. On the other hand, the absorption cross-section of the YbDF-A according to Practical Example 1 does not differ greatly from the YbDF-B according to Practical Example 2, as shown in the area (a) of FIG. 3. In other words, in the YbDF-A according to Practical Example 1, the ratio between the stimulated emission cross-section and the absorption cross-section is smaller than the YbDF-B according to Practical Example 2. Consequently, the noise factor (NF) deteriorates and hence there is a tendency for the signal to noise ratio (SN ratio) to decline when the light to be amplified is taken as signal light.

For example, in a laser light source apparatus which employs the optical amplifier module 3A relating to the first embodiment shown in FIG. 2, for example, if the seed light source (light source 2) is pulse modulated at a repetition frequency of 50 kHz and pulse width of 20 ns (in other words, a duty ratio of 1/1000), as performed typically in a laser processing apparatus or the like, then even supposing that the output is 200 mW when the seed light source is on, the average output of the optical amplifier module 3 will be 0.2 mW, and therefore in a case where the light to be amplified is injected directly into a YbDF-A according to Practical Example 1 which is used as the first optical amplification waveguide 41, although it is possible to avoid photodarkening, the SN ratio deteriorates. In other words, the ratio between the light to be amplified and the ASE (amplified spontaneous emission) at the output terminal of the YbDF-A according to Practical Example 1 deteriorates. Even when, for example, a wavelength selector element, such as a bandpass filter (BPF) or the like, for removing wavelength components other that the wavelength of the light to be amplified were to be inserted immediately after the YbDF-A according to Practical Example 1, it would still be impossible to remove the ASE component which virtually coincides with the light to be amplified. Consequently, the ASE component is raised at the output terminal of the second optical amplification waveguide 43 (the final output terminal of the optical amplifier module 3A), and the light to be amplified component is suppressed. More specifically, although the pulse peak power ought to reach 20 kW or above, it only reaches 15 kW or lower.

Figure 10:
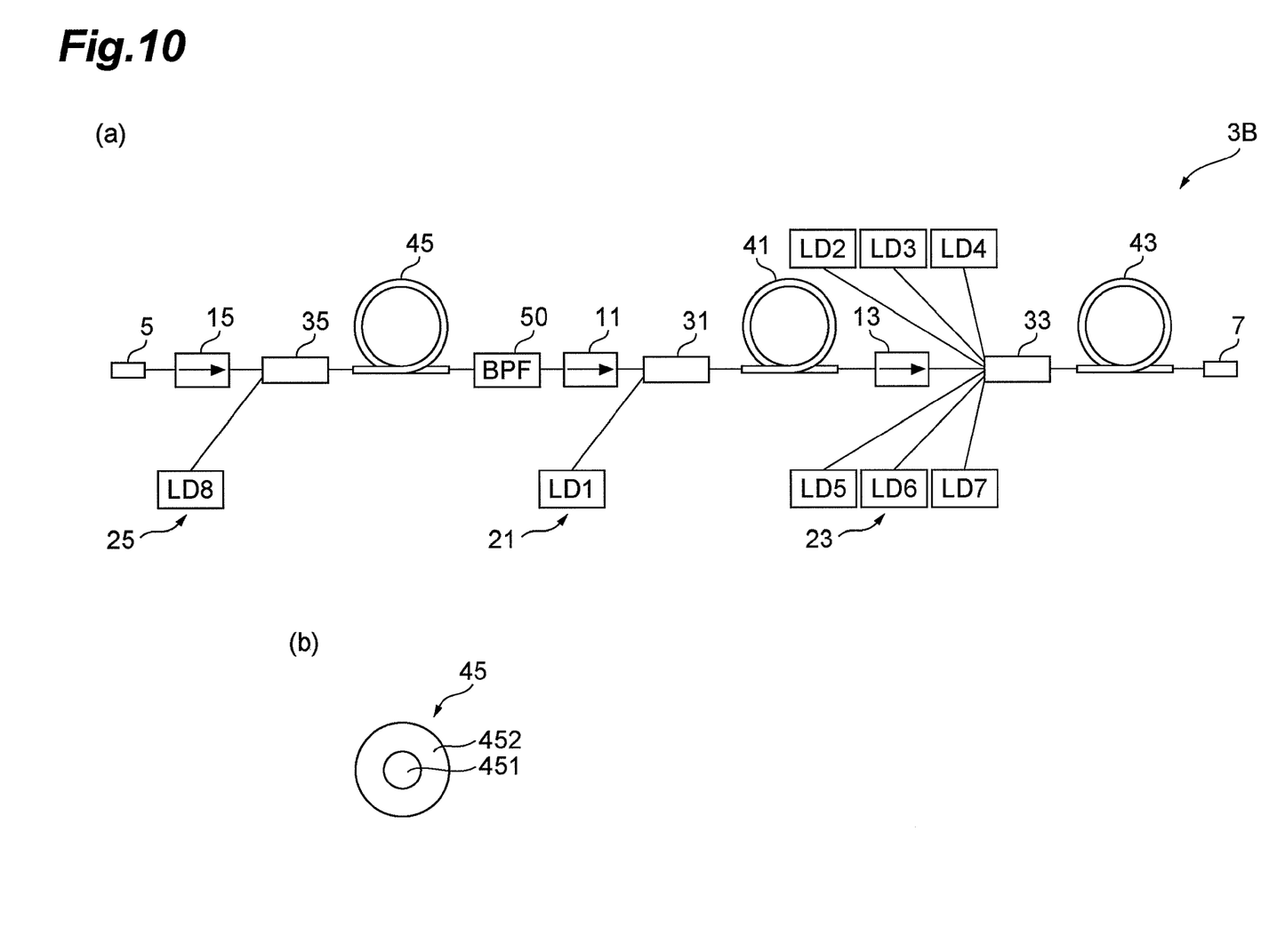
FIG. 10 is a diagram showing the composition of an optical amplifier module (a second embodiment of an optical amplifier module according to the present invention), which can be applied to a laser light source apparatus relating to the present invention.

Therefore, in order to avoid situations of this kind, desirably, the laser light source apparatus according to the present invention comprises an optical amplifier module such as that shown in FIG. 10 (a second embodiment of an optical amplifier module according to the present invention) which is disposed immediately after the light source 2. The optical amplifier module 3B relating to this second embodiment includes the composition of the optical amplifier module 3A relating to the first embodiment shown in FIG. 2 and is characterized in comprising a third optical amplification waveguide 45 which is a Yb-doped fiber that is not doped with P on the upstream side of the first optical amplification waveguide 41 with respect to the direction of propagation of the light to be amplified (the direction from the input terminal 105 to the output terminal 107). A bandpass filter 50 (BPF) is inserted as an optical filter for removing ASE light, whose wavelength does not correspond to the wavelength of the light to be amplified, between the third optical amplification waveguide 45 and the first optical amplification waveguide 41.

As shown in the area (a) of FIG. 10, an optical coupler 35 is provided on the input terminal side of the third optical amplification waveguide 45, and furthermore, an optical isolator 15 which transmits the light to be amplified propagating in the forward direction and shields pumping light which propagates in the reverse direction is provided between the optical coupler 35 and the input terminal 5. The optical coupler 35 outputs the light to be amplified that has been inputted via the input terminal 5, as well as the pumping light outputted from the laser diode LD8 which constitutes the pumping light source unit 24, to the third optical amplification waveguide 45. Furthermore, a BPF 50 is provided on the output terminal side of the third optical amplification waveguide 45, and the composition to the downstream side of this BPF 50 is similar to the optical amplifier module 3A relating to the first embodiment which is shown in FIG. 2.

As shown in the area (b) of FIG. 10, the third optical amplification waveguide 45 is a Yb-doped fiber (hereinafter, called "Yb-doped fiber D") having a single-cladding structure constituted by a core region 451 (third optical waveguide region) and a cladding region 452 which surrounds the core region 451. Furthermore, the YbDF-D is a Yb-doped fiber comprised of a silica glass as a main component, and a core region 451 co-doped with 5 wt % Al; the core diameter is 10 µm, the cladding diameter is approximately 125 µm, the non-saturated absorption of 915 nm-waveband pumping light is 70 dB/m, and the non-saturated absorption peak of pumping light in the 975 nm-band is 240 dB/m. The non-saturated absorption of 915 nm-band pumping light in the YbDF-D of the third optical amplification waveguide 45 is a figure obtained assuming a cladding-pumped fiber. Furthermore, the Yb weight concentration in the YbDF-D is 2000 wt-ppm.

In the optical amplifier module 3B relating to the second embodiment, it is also necessary to avoid photodarkening and therefore a fiber having a low Yb concentration is used, such as the YbDF-D of the third optical amplification waveguide 45. Desirably, the Yb concentration of the YbDF-D is set at the least to be lower than the first or second optical amplification waveguide 41 (for example, the YbDF-A according to Practical Example 1) or the second optical amplification waveguide 43 (for example, the YbDF-B according to Practical Example 2 or the YbDF-C according to Practical Example 3) which are disposed to the downstream side thereof, and ideally, it is restricted to approximately one half of the lowest concentration of the YbDF-A to YbDF-C.

Here, generally, when a Yb-doped fiber having a lower Yb doping concentration is cladding-pumped, then there is little overlap between the core region and the pumping light mode, due to the low Yb doping concentration, and therefore it is necessary to have an extremely long YbDF (for example, if it were sought to achieve an absorption-length product similar to the area (a) of FIG. 3, then the length of the YbDF would approach about 1 km). Therefore, desirably, a single transverse mode pumping light is used for the pumping of the light to be amplified. Consequently, in the YbDF-D of the third optical amplification waveguide 45 according to the second embodiment, the Yb dopant concentration is set in such a manner that the non-saturated absorption of 915 nm-band pumping light in single transverse mode is 70 dB/m (the non-saturated absorption peak of 975 nm-band pumping light is 240 dB/m). In the optical amplifier module 3B according to this second embodiment, the pumping light source unit 35 which supplies pumping light to the YbDF-D is a 0.975 µm-band pump LD having a single-mode output power rating of 0.5 W. The length of the YbDF-D employed in the optical amplifier module 3B according to the second embodiment is 7 m.

Furthermore, in the optical amplifier module 3B relating to this third embodiment, when a YbDF-D is used in a third optical amplification waveguide 45, then the possible combinations of fiber types for the first optical amplification waveguide 41 and the second optical amplification waveguide 43 are, for example: the YbDF-A as the first optical amplification waveguide 41 and the YbDF-B as the second optical amplification waveguide 43; or the YbDF-A as the first optical amplification waveguide 41 and the YbDF-C as the second optical amplification waveguide 43; or furthermore, the YbDF-C as the first optical amplification waveguide 41 and the YbDF-C as the second optical amplification waveguide 43.

The present invention is not limited to the embodiments described above, and various modifications are also possible. For example, in the present embodiments, the optical amplifier module 3 employs a two-stage structure in which a first and a second optical amplification waveguide 41 and 43 are arranged in series, but it is also possible to use three or more stages, in accordance with the required gain value. However, it is desirable to use the first optical amplification waveguide 41 in the stage where the light to be amplified is first inputted, and to use the second optical amplification waveguide 43 directly in the vicinity of the output terminal of the optical amplifier module 3. In this case, from the results of the Experimental Example 1, it can be expected that a pumping power approximately 1.3 times that of the second optical amplification waveguide 43 will be required for the pumping in the first optical amplification waveguide 41. However, the sum total of the required pumping power is governed by the total power of the laser diodes LD2 to LD7 of the pumping light source unit 23 which supply pumping light to the second optical amplification waveguide 43 on the output terminal 7 side of the optical amplifier module 3, and therefore the related increase in power is of a negligible level.

Furthermore, in the present embodiment, the first and second optical amplification waveguides 41 and 43 are Yb-doped fibers, but the invention is not limited to this and it is also possible to adopt a planar waveguide composition, especially when the main component of the first optical amplification waveguide 41 is a phosphate glass.

In accordance with the optical amplifier module and the laser light source apparatus according to the present invention, it is possible to suppress photodarkening effectively, as well as being able to achieve efficient optical amplification.

What is claimed is:
1. An optical amplifier module, comprising:
a first optical amplification waveguide mainly comprised of a silica glass, the first optical amplification waveguide including a ytterbium-doped first optical waveguide region which is co-doped with phosphorous;
a second optical amplification waveguide optically coupled to the first optical amplification waveguide, the second optical amplification waveguide including a ytterbium-doped second optical waveguide region which is co-doped with aluminum, the second optical amplification waveguide being mainly comprised of a silica glass and having a dual-cladding structure; and
a pumping unit supplying pumping light respectively to the first optical amplification waveguide and the second optical amplification waveguide,
wherein the first and second optical amplification waveguides are arranged such that light to be amplified, having been inputted to the first optical amplification waveguide, propagates through the first optical amplification waveguide and then the second optical amplification waveguide successively, and the light to be amplified is amplified only once by means of the pumping light, in each of the first optical amplification waveguide and the second optical amplification waveguide,
wherein a population inversion ratio of the first optical amplification waveguide is set higher than that of the second optical fiber amplification waveguide, and the first optical amplification waveguide has a pumping efficiency lower than that of the second optical amplification waveguide.

2. An optical amplifier module according to claim 1, wherein the first and second optical amplification waveguides include ytterbium-doped optical fibers, respectively.

3. An optical amplifier module according to claim 1, wherein the second optical waveguide region of the second optical amplification waveguide is also doped with phosphorous, and, with respect to 915 nm-band pumping light, a non-saturated absorption of the second optical amplification waveguide is lower than a non-saturated absorption of the first optical amplification waveguide.

4. An optical amplifier module according to claim 1, further comprising: an optical filter disposed on an upstream side of the first optical amplification waveguide in terms of the direction of propagation of the light to be amplified, the optical filter transmitting only a wavelength component of the light to be amplified but attenuating other wavelength components; and a third optical amplification waveguide including a ytterbium-doped third optical waveguide region which is co-doped with aluminum but not co-doped with phosphorous, the third optical amplification waveguide having a non-saturated absorption that is half or less of a non-saturated absorption of the second optical amplification waveguide, with respect to 915 nm-band pumping light.

5. A laser light source apparatus, comprising:
a light source outputting light to be amplified having a central wavelength in a range of 1062 to 1072 nm; and
an optical amplifier module according to claim 1, the optical amplifier module optically amplifies the light to be amplified which has been outputted from the light source.

6. A laser light source apparatus according to claim 5, wherein the light to be amplified has a pulse width in a range of 1 ns to 100 ns.

7. An optical amplifier module, comprising:
a first optical amplification waveguide mainly comprised of a phosphate glass, the first optical amplification waveguide including a ytterbium-doped first optical waveguide region;
a second optical amplification waveguide optically coupled to the first optical amplification waveguide, the second optical amplification waveguide including a ytterbium-doped second optical waveguide region which is co-doped with aluminum, the second optical amplification waveguide being mainly comprised of a silica glass and having a dual-cladding structure; and
a pumping unit supplying pumping light respectively to the first optical amplification waveguide and the second optical amplification waveguide,
wherein the first and second optical amplification waveguides are arranged such that light to be amplified, having been inputted to the first optical amplification waveguide, propagates through the first optical amplification waveguide and then the second optical amplification waveguide successively, and the light to be amplified is amplified only once by means of the pumping light, in each of the first optical amplification waveguide and the second optical amplification waveguide,
wherein a population inversion ratio of the first optical amplification waveguide is set higher than that of the second optical fiber amplification waveguide, and the first optical amplification waveguide has a pumping efficiency lower than that of the second optical amplification waveguide.

8. An optical amplifier module according to claim 7, wherein the first and second optical amplification waveguides include ytterbium-doped optical fibers, respectively.

9. An optical amplifier module according to claim 7, wherein the second optical waveguide region of the second optical amplification waveguide is also doped with phosphorous, and, with respect to 915 nm-band pumping light, a non-saturated absorption of the second optical amplification waveguide is lower than a non-saturated absorption of the first optical amplification waveguide.

10. An optical amplifier module according to claim 7, further comprising:
   an optical filter disposed on an upstream side of the first optical amplification waveguide in terms of the direction of propagation of the light to be amplified, the optical filter transmitting only a wavelength component of the light to be amplified but attenuating other wavelength components; and
   a third optical amplification waveguide including a ytterbium-doped third optical waveguide region which is co-doped with aluminum but not co-doped with phosphorous, the third optical amplification waveguide having a non-saturated absorption that is half or less of a non-saturated absorption of the second optical amplification waveguide, with respect to 915 nm-band pumping light.

11. A laser light source apparatus, comprising: a light source outputting light to be amplified having a central wavelength in a range of 1062 to 1072 nm; and an optical amplifier module according to claim 7, the optical amplifier module optically amplifies the light to be amplified which has been outputted from the light source.

12. A laser light source apparatus according to claim 11, wherein the light to be amplified has a pulse width in a range of 1 ns to 100 ns.

* * * * *